(12) United States Patent
Kim et al.

(10) Patent No.: US 10,065,405 B2
(45) Date of Patent: Sep. 4, 2018

(54) FILM FOR TIRE INNER LINER, METHOD FOR MANUFACTURING FILM FOR TIRE INNER LINER, PNEUMATIC TIRE, AND METHOD FOR MANUFACTURING PNEUMATIC TIRE

(71) Applicant: KOLON INDUSTRIES, INC., Gwacheon-si (KR)

(72) Inventors: Yun-Jo Kim, Gumi-si (KR); Si-Min Kim, Daegu (KR); Dong-Jin Kim, Gumi-si (KR); Il Chung, Daegu (KR); Dong-Hyeon Choi, Gyeongsan-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 951 days.

(21) Appl. No.: 14/380,445

(22) PCT Filed: Mar. 8, 2013

(86) PCT No.: PCT/KR2013/001895
§ 371 (c)(1),
(2) Date: Aug. 22, 2014

(87) PCT Pub. No.: WO2013/133666
PCT Pub. Date: Sep. 12, 2013

(65) Prior Publication Data
US 2015/0017361 A1 Jan. 15, 2015

Related U.S. Application Data

(60) Provisional application No. 61/620,508, filed on Apr. 5, 2012, provisional application No. 61/617,124, filed
(Continued)

(30) Foreign Application Priority Data

Mar. 8, 2012 (KR) .................. 10-2012-0024046
Mar. 8, 2012 (KR) .................. 10-2012-0024047
(Continued)

(51) Int. Cl.
*B32B 38/00* (2006.01)
*B29D 30/06* (2006.01)
(Continued)

(52) U.S. Cl.
CPC ...... *B32B 38/0012* (2013.01); *B29C 47/0004* (2013.01); *B29C 47/0021* (2013.01);
(Continued)

(58) Field of Classification Search
CPC .. C08G 69/40; C09J 7/0282; Y10T 428/1352; Y10T 428/1386; B32B 37/14; B32B 37/142; B32B 38/0012
See application file for complete search history.

(56) References Cited

U.S. PATENT DOCUMENTS

| | | | |
|---|---|---|---|
| 5,938,869 A | 8/1999 | Kaido | |
| 2005/0027098 A1* | 2/2005 | Hayes | C08G 63/6886 528/272 |

(Continued)

FOREIGN PATENT DOCUMENTS

| | | |
|---|---|---|
| EP | 0109475 | 5/1984 |
| JP | 59-093345 | 5/1984 |

(Continued)

OTHER PUBLICATIONS

The extended Search Report, European Patent Office, dated Jun. 22, 2015, EP Patent Application No. 13758704.4.
(Continued)

*Primary Examiner* — Walter Aughenbaugh
(74) *Attorney, Agent, or Firm* — Lex IP Meister, PLLC

(57) ABSTRACT

This disclosure relates to a film for a tire inner liner film that may exhibit uniform excellent physical properties over all directions when applied to a tire, and may secure excellent durability and fatigue resistance in a tire manufacturing process or in an automobile running process, a method for manufacturing the film for a tire inner liner, a pneumatic tire using the tire inner liner film, and a method for manufacturing the pneumatic tire using the tire inner liner film.

21 Claims, 2 Drawing Sheets

Related U.S. Application Data on Mar. 29, 2012, provisional application No. 61/617,119, filed on Mar. 29, 2012.

(30) Foreign Application Priority Data

| Mar. 9, 2012 | (KR) | .................. | 10-2012-0024649 |
|---|---|---|---|
| Mar. 8, 2013 | (KR) | .................. | 10-2013-0024896 |
| Mar. 8, 2013 | (KR) | .................. | 10-2013-0024897 |

(51) Int. Cl.

| B60C 5/14 | (2006.01) |
|---|---|
| C08G 69/40 | (2006.01) |
| C08J 5/18 | (2006.01) |
| B29C 47/00 | (2006.01) |
| B29C 53/56 | (2006.01) |
| B32B 37/14 | (2006.01) |
| B60C 1/00 | (2006.01) |
| C09J 7/25 | (2018.01) |
| B29K 71/00 | (2006.01) |
| B29K 77/00 | (2006.01) |
| B29K 105/00 | (2006.01) |
| B29L 30/00 | (2006.01) |
| B29C 47/88 | (2006.01) |

(52) U.S. Cl.
CPC .......... *B29C 47/0057* (2013.01); *B29C 53/56* (2013.01); *B29D 30/06* (2013.01); *B32B 37/142* (2013.01); *B60C 1/0008* (2013.01); *B60C 5/14* (2013.01); *C08G 69/40* (2013.01); *C08J 5/18* (2013.01); *C09J 7/25* (2018.01); *B29C 47/8845* (2013.01); *B29D 2030/0682* (2013.01); *B29K 2071/00* (2013.01); *B29K 2077/00* (2013.01); *B29K 2105/0085* (2013.01); *B29L 2030/008* (2013.01); *B32B 2605/00* (2013.01); *C08J 2377/02* (2013.01); *C08J 2471/02* (2013.01); *C09J 2425/00* (2013.01); *C09J 2461/00* (2013.01); *C09J 2471/006* (2013.01); *C09J 2477/006* (2013.01); *Y10T 428/1352* (2015.01); *Y10T 428/28* (2015.01); *Y10T 428/2883* (2015.01)

(56) References Cited

U.S. PATENT DOCUMENTS

| 2006/0138686 | A1* | 6/2006 | Ouderkirk | ............... B29C 55/04 |
|---|---|---|---|---|
| | | | | 264/2.7 |
| 2008/0142141 | A1 | 6/2008 | Takahashi | |
| 2011/0214790 | A1 | 9/2011 | Noda | |
| 2012/0234450 | A1* | 9/2012 | Mruk | .................. B60C 17/0018 |
| | | | | 152/517 |
| 2013/0065001 | A1 | 3/2013 | Kani | |

FOREIGN PATENT DOCUMENTS

| JP | 08-258506 | 10/1996 |
|---|---|---|
| JP | 2004-506540 | 3/2004 |
| JP | 2006-103106 | 4/2006 |
| JP | 2006-231616 | 9/2006 |
| JP | 2006-315339 | 11/2006 |
| JP | 2007-030691 | 2/2007 |
| JP | 2007-276581 | 10/2007 |
| JP | 2008-149928 | 7/2008 |
| JP | 2012-025275 | 2/2012 |
| JP | 2012-031405 | 2/2012 |
| JP | 2013-510744 | 3/2013 |
| JP | 2013-528666 | 7/2013 |
| JP | 2013-531101 | 8/2013 |
| KR | 10-1995-0031551 | 12/1995 |
| KR | 10-2005-0100082 | 10/2005 |
| KR | 10-2005-0122461 | 12/2005 |
| KR | 10-2011-0001651 | 1/2011 |
| KR | 10-2011-0060805 | 6/2011 |
| KR | 10-2011-0110024 | 10/2011 |
| KR | 10-2012-0002478 | 1/2012 |
| KR | 10-2012-0002495 | 1/2012 |
| WO | 2010-084647 | 7/2010 |
| WO | 2011-062724 | 5/2011 |
| WO | 2011-122876 | 10/2011 |
| WO | 2012-002750 | 1/2012 |

OTHER PUBLICATIONS

International Search Report, PCT, PCT/KR2013/001895, dated Jun. 21, 2013.

\* cited by examiner

【FIGURE 1】
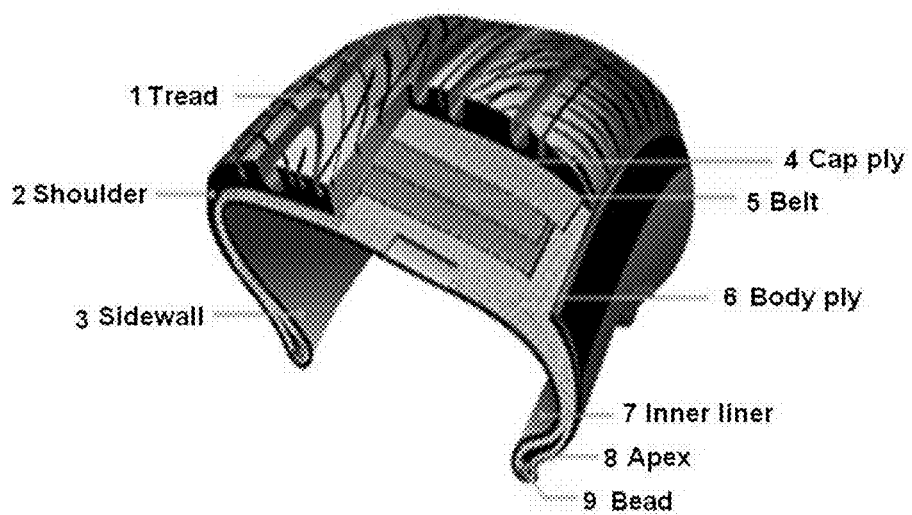

[FIGURE 2]

FILM FOR TIRE INNER LINER, METHOD FOR MANUFACTURING FILM FOR TIRE INNER LINER, PNEUMATIC TIRE, AND METHOD FOR MANUFACTURING PNEUMATIC TIRE

FIELD OF THE INVENTION

The present invention relates to a film for a tire inner liner, a method for manufacturing a film for a tire inner liner, a pneumatic tire, and a method for manufacturing a pneumatic tire, and more particularly, to a tire inner liner film that may exhibit uniform excellent physical properties in all directions when applied to a tire, and may secure excellent durability and fatigue resistance in a tire manufacturing process or in an automobile running process, a method for manufacturing the film for a tire inner liner, a pneumatic tire using the tire inner liner film, and a method for manufacturing the pneumatic tire using the tire inner liner film.

BACKGROUND OF THE INVENTION

A tire withstands the weight of an automobile, reduces impact from the road, and transfers driving force or braking force of the automobile to the ground. In general, a tire is a complex of fiber/steel/rubber, and has a structure as shown in FIG. 1.

Tread (1): a part contacting the road. It should afford frictional force required for driving, have good wear resistance, withstand external impact, and have low heat generation.

Body Ply or Carcass (6): a cord layer in the tire. It should support the weight, withstand impact, and have high fatigue resistance to bending and stretching while running.

Belt (5): located between the body plies, consists of steel wire in most cases, reduces external impact, and maintains a wide tread to afford excellent vehicle running stability.

Side Wall (3): a rubber layer between a part below a shoulder (2) and bead (9). It protects the inner body ply (6).

Inner Liner (7): located inside the tire instead of a tube, and prevents air leakage to enable a pneumatic tire.

Bead (9): square or hexagonal wire bundle formed of rubber-coated steel wire. It positions and fixes the tire in a rim.

Cap ply (4): a special cord located on a belt of a radial tire for some cars. It minimizes movement of the belt during running.

Apex (8): triangle rubber filler used to minimize dispersion of the bead, reduce external impact to protect the bead, and prevent air inflow during forming.

Recently, a tubeless tire where high pressure air of 30 to 40 psi is injected has been commonly used without a tube, and to prevent air leakage during automobile running, an inner liner having a high gas barrier property is positioned as the inner layer of the carcass.

Previously, a tire inner liner including a rubber such as butyl rubber or halobutyl rubber and the like having relatively low air permeability as a main ingredient was used, but to achieve a sufficient gas barrier property of the inner liner, rubber content or inner liner thickness should be increased. However, if rubber content and tire thickness are increased, total weight of the tire may be increased and automobile mileage may be degraded.

Further, since the rubber ingredients have relatively low heat resistance, air pockets may be generated between rubber in the inner surface of a carcass layer and the inner liner, or the shape or physical property of the inner liner may be changed in a vulcanization process of a tire or in an automobile running process during which repeated deformations occur at a high temperature. To bond the rubber ingredients to a carcass layer of a tire, a vulcanizer should be used or a vulcanization process should be applied, but sufficient adhesion cannot be secured therewith.

Therefore, various methods have been suggested to decrease the thickness and weight of the inner liner to increase mileage, reduce changes in the shape or properties of the inner liner during vulcanization of a tire or running, and the like. However, previously known methods have limitations in maintaining excellent air permeability and formability of a tire while sufficiently decreasing the thickness and weight of the inner liner. Also, the inner liner manufactured by the previously known method exhibited property degradation, generated cracks, and the like in a tire manufacturing process during which repeated deformations occur at a high temperature, or in an automobile running process during which repeated deformations occur and high heat is generated.

DETAILED DESCRIPTION OF THE INVENTION

Technical Objectives

It is an object of the present invention to provide a film for a tire inner liner film that may exhibit uniform excellent physical properties over all directions when applied to a tire, and that may secure excellent durability and fatigue resistance in a tire manufacturing process or in an automobile running process.

It is another object of the invention to provide a method for manufacturing the film for a tire inner liner.

It is still another object of the invention to provide a pneumatic tire manufactured using the tire inner liner film.

It is still another object of the invention to provide a method for manufacturing a pneumatic tire using the tire inner liner film obtained by the manufacturing method of a tire inner liner film.

It is still another object of the invention to provide a method for manufacturing a pneumatic tire that affords uniform and excellent physical properties and a stable structure to an inner liner film and the internal structure of a tire over all directions, and affords excellent mechanical properties, durability, and fatigue resistance in a tire manufacturing process or in an automobile running process.

Technical Solutions

There is provided a film for a tire inner liner including a base film that is drawn or oriented in a first direction, and is in the undrawn state in a second direction perpendicular to the first direction, wherein the first direction is set parallel to the longitudinal direction of a tire forming drum for manufacturing a pneumatic tire, and the strength ratio of the first direction and the second direction of the base film is 1.1:1 to 2:1.

And, there is provided a method for manufacturing the film for a tire inner liner, including: melting and extruding raw material for a base film to form a base film having a width of 1000 mm or more in the transverse direction (TD); and orienting the base film such that total draft in the machine direction becomes 6 to 20.

And, there is provided a method for manufacturing a film for a tire inner liner, including: melting and extruding a raw material for a base film to form a base film; drawing the base film 5% to 50% in the transverse direction; and forming an adhesive layer on at least one side of the base film, wherein the strength ratio of the machine direction (MD) and the transverse direction (TD) of the base film is 1:1.1 to 1:2.

And, there is provided a pneumatic tire manufactured using the film for a tire inner liner.

The tire inner liner film obtained by the manufacturing method of a tire inner liner film is cut to the size of a tire, and there is provided a method for manufacturing a pneumatic tire, including mounting the tire inner liner film on a tire forming drum in a horizontal direction to the width direction of the forming drum, so that the machine direction (MD) of a base film becomes the radial direction of a tire when forming the tire.

And, there is provided a method for manufacturing a pneumatic tire, including: melting and extruding a raw material for an inner liner film to form an inner liner film; and positioning the inner liner film on a tire forming drum so that the machine direction (MD) forms an angle with the longitudinal direction of the tire forming drum of 0° or more and less than 90°.

Hereinafter, a film for a tire inner liner, a method for manufacturing a film for a tire inner liner, a pneumatic tire, and a method for manufacturing a pneumatic tire according to specific embodiments of the invention will be explained in detail.

According to one embodiment of the invention, provided is a film for a tire inner liner including a base film that is drawn or oriented in a first direction, and is in an undrawn state in a second direction perpendicular to the first direction, wherein the first direction is set parallel to the longitudinal direction of a tire forming drum for manufacturing a pneumatic tire, and the strength ratio of the first direction and the second direction of the base film is 1.1:1 to 2:1.

The "first direction" of the base film means a direction parallel to the axial direction of a forming drum when the film for a tire inner liner is practically applied and mounted (or laminated or wound) on a forming drum for manufacturing a tire. The "second direction" means a direction perpendicular to the first direction.

The term "undrawn" means a state wherein drawing is not substantially generated in the manufacturing process of a film for a tire inner liner, or the degree of drawing is slight so that orientation of the manufactured film is not generated or the shape of the film is not substantially changed.

In the process of tire forming and manufacturing, the shape of an inner liner is deformed during various processes including tire forming, vulcanization processes, and the like, and particularly, a difference in the degrees of deformation of the radial direction and the circumferential direction is large. In general, since the deformation rate in the circumferential direction of a tire is much higher compared to that in the radial direction, an orientation difference is significantly generated in the two directions due to the deformation by a tire manufacturing process, and thus physical properties of the inner liner may become non-uniform and parts having relatively inferior physical properties may be generated. As external stress is concentrated on the parts having inferior physical properties, the inner liner may be damaged or broken, and it may be difficult to secure durability and fatigue resistance required for a tire.

In the previously known methods for manufacturing a film for a tire inner liner and a tire, the machine direction (MD) of a base film for an inner liner is applied to the circumferential direction of a tire that surrounds a forming drum, and the transverse direction (TD) of a base film is positioned parallel to the axis of the forming drum and applied to the radial direction of a tire. The radial direction and the circumferential direction are as shown in FIG. 2.

To the contrary, according to the film for a tire inner liner according to one embodiment of the invention, since a part that is oriented or drawn to some degree is applied to the radial direction and a non-drawn part is applied to the circumferential direction, a problem of non-uniformity of physical properties resulting from non-uniformity of orientation due to differences in the degrees of deformation in the radial direction and the circumferential direction of a tire, which is generated in a tire manufacturing process, may be overcome, and thus the physical properties of a tire inner liner may be uniformly exhibited over all directions, and vulnerable parts where breakage may occur due to external stress may be removed, thus securing durability and fatigue resistance required for a tire.

Specifically, the strength ratio of the first direction and the second direction of the base film may be 1.1:1 to 2:1, preferably 1.2:1 to 1.6:1. The strength ratio of the first direction and the second direction of the film results from the degree of drawing in the transverse direction (TD) of the film. The strength ratio allows the formation of an inner liner that does not have a difference in thickness or physical properties in a specific direction within a finally manufactured tire, and it affords mechanical properties, durability, and fatigue resistance required in a tire manufacturing process or in an automobile running process.

Meanwhile, as described in the manufacturing method below, the film for a tire inner liner may be manufactured by adjusting the width of the transverse direction (TD) of the base film above a certain width and orienting the base film such that the total draft in the machine direction may become 6 to 20.

The manufactured film for a tire inner liner may have a slight difference in physical properties and shape over all directions, particularly between the radial direction and the circumferential direction, and thus may exhibit uniform and excellent physical properties, and may secure excellent durability and fatigue resistance in a tire manufacturing process or in an automobile running process.

As explained above, the "first direction" of the base film is a direction parallel to the axial direction of a forming drum when the film for a tire inner liner is practically applied and mounted (or laminated or wound) on a forming drum for manufacturing a tire, and it is parallel to the radial direction (width direction) of a tire. In a film for a tire inner liner that is manufactured by orienting the base film such that total draft in the machine direction becomes 6 to 20, it may be the machine direction (MD) in which a base film is formed during the manufacturing process of a tire inner liner film described below.

Thereby, in a film for a tire inner liner manufactured by orienting the base film such that the total draft in the machine direction may become 6 to 20, the "second direction" of the base film may be a transverse direction perpendicular to the direction in which the base film is formed during the manufacturing process of a tire inner liner film, and it is applied in the circumferential direction in a tire.

The film for a tire inner liner that is manufactured by orienting the base film such that the total draft in the machine direction may become 6 to 20 is applied such that the machine direction (MD) in the manufacturing process of a tire may become the radial direction of a tire, and the length of the machine direction (MD) of the inner liner film may be controlled according to the width of a forming drum in the manufacturing process of a tire. For example, in the manufacturing process of a tire, the inner liner film may have a length of 300 mm to 800 mm in the machine direction (MD), and it may be applied such that the machine direction of the length may be horizontal to the radial direction of a tire.

Thereby, the transverse direction (TD) of the base film in the tire inner liner film is applied to the circumferential direction of a tire, and the width of the transverse direction (TD) of the base film may be largely varied according to the sizes of a tire and a forming drum, but, for example, it may be 1000 mm or more, preferably 1200 mm to 2000 mm. That is, the length of the second direction of the base film may be 1000 mm or more.

Meanwhile, as a film for a tire inner liner is manufactured by orienting the base film such that the total draft in the machine direction may become 6 to 20, drawing or orientation may be generated to some degree in the first direction (a direction set parallel to the axial direction of a tire forming drum for manufacturing a pneumatic tire) of the base film, and the base film may be in the undrawn state in the second direction perpendicular to the first direction. Further, the strength ratio of the machine direction (MD) and the transverse direction (TD) of the base film may be 1.1:1 to 2:1, preferably 1.2:1 to 1.6:1.

Particularly, the film for a tire inner liner including the base film having the above-described properties may exhibit uniform thickness and physical properties without a difference in thickness or physical properties in a specific direction in the finally manufactured tire, and since the elasticity is not significantly lowered, generation of crystals in the film or tearing in a specific direction may be prevented. That is, the film for a tire inner liner may secure mechanical properties, durability, or fatigue resistance required in a tire manufacturing process or in an automobile running process.

Meanwhile, according to another manufacturing method described below, the film for a tire inner liner may be manufactured while drawing 5% to 50% in the transverse direction (TD) of the film. Specifically, after forming the base film, the film may be drawn 5% to 50% in the transverse direction during the process of forming an adhesive layer on the base film, thereby manufacturing the film for a tire inner liner. Thereby, the base film of the film for a tire inner liner may be drawn 5% to 50% in the first direction, and an adhesive layer may be formed on at least one side of the base film.

In the above film for a tire inner liner, the transverse direction (TD) of the base film is applied to the radial direction (width direction) of a tire, and the machine direction (MD) of the base film is applied to the circumferential direction of a tire. Therefore, when the film is applied to a tire manufacturing process or a tire, a difference in physical properties and shape over all directions, particularly between the radial direction and the circumferential direction of a tire, is slight, and thus uniform and excellent physical properties may be exhibited, and excellent durability and fatigue resistance may be secured in a tire manufacturing process or in an automobile running process.

When the base film is applied to a tire inner liner, the first direction, that is, the transverse direction (TD) of the base film, is applied to the radial direction of a tire, and the length of the first direction of the base film may be varied according to the sizes of a tire and a forming drum, and for example, it may be 1000 mm or less, and preferably 300 mm to 800 mm.

The second direction, that is, the machine direction (MD) of the base film, is applied to the circumferential direction of a tire, and the length of the second direction may be varied according to the sizes of a tire and a forming drum, and for example, it may be 1000 mm or more, and preferably 1000 mm to 2000 mm.

Meanwhile, for the manufacturing of the base film of the film for a tire inner liner of one embodiment, previously known butyl rubber, synthetic rubber, polyamide-based resin, and the like may be used. However, in order to realize an excellent gas barrier property with a thin thickness to make the weight of a tire light, improve automobile mileage, and afford excellent formability and mechanical properties, the base film may include (i) a copolymer including polyamide-based segments and polyether-based segments, or (ii) a mixture of resins of a polymer including polyamide-based segments and a polymer including polyether-based segments. More preferably, the content of the polyether-based segments of the copolymer or the content of the polymer including polyether-based segments may be 5 wt % to 50 wt %, or 15 wt % to 45 wt %, based on the total weight of the base film.

Since the base film includes the copolymer of polyamide-based segments and polyether-based segments, it may be distinguished from the previous tire inner liner film including rubber or thermoplastic resin as a main component, and it may not need an additional vulcanizer.

Meanwhile, it appears that the properties of the tire inner liner film result from the use of the base film including a specific content of polyether-based segments which afford an elastomeric property together with polyamide-based segments. The polyamide-based segments exhibit an excellent gas barrier property, for example, a 10 to 20 times higher gas barrier property compared to butyl rubber and the like commonly used in a tire at the same thickness, due to the intrinsic molecular chain property, and exhibit a low modulus property compared to other resins.

Since the polyether-based segments are used together with the polyamide-based segments in the content of 5 wt % to 50 wt %, or 15 wt % to 45 wt %, based on the total weight of the base film, the film for a tire inner liner may exhibit a low modulus property or a relatively small load may be generated under specific stretching conditions, physical properties may not be significantly changed even after heat treatment, and structural change due to crystallization of polyamide and the like may be inhibited, and thus durability to deformation of a tire may be improved.

In case the base film includes a resin mixture of the polymer including polyamide-based segments and the polymer including polyether-based segments, the above-explained properties including the gas barrier property, modulus, and the like may also be exhibited.

Thus, the inner liner film may be stretched or deformed according to the shape of a tire with a small force when forming a tire, which affords excellent formability to a tire.

The polyamide-based segment refers to a repeat unit including an amide group (—CONH—), and it may be formed from a polyamide-based resin or a precursor thereof that participates in a polymerization reaction.

Since the polyamide-based segment has sufficient heat resistance and chemical stability, it may prevent deformation or degradation of an inner liner film when exposed to chemical substances such as additives or high temperature conditions that are applied in a tire manufacturing process. As the polyamide-based segments are copolymerized with polyether-based segments, the base film may have relatively high reactivity to an adhesive (for example, a resorcinol-formalin-latex (RFL)-based adhesive), and thus the inner liner film may be easily adhered to a carcass part.

Specifically, the polyamide-based segment may be a main repeat unit that is included in the polyamide-based resin selected from the group consisting of nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP and a copolymer of nylon 66/PPS, methoxy methylate of 6-nylon, methoxy methylate of 6-610-nylon, or methoxy methylate of 612-nylon. For example, it is known that the main repeat unit of nylon 6 is the following Chemical Formula 1 wherein R1 is an alkylene having carbon number of 5, and the main repeat units of other polyamide-based resins are also well known to one of ordinary knowledge in the art.

The polyamide-based segment may include a repeat unit of the following Chemical Formula 1 or Chemical Formula 2.

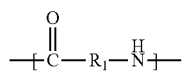  [Chemical Formula 1]

In Chemical Formula 1, $R_1$ is a C1-20 linear or branched alkylene group or a C7-20 linear or branched arylalkylene group.

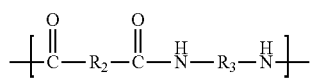  [Chemical Formula 2]

In Chemical Formula 2, $R_2$ is a C1-20 linear or branched alkylene group, and $R_3$ is a C1-20 linear or branched alkylene group or a C7-20 linear or branched arylalkylene group.

As used herein, the alkylene group refers to a divalent functional group derived from an alkyl group, and the arylalkylene group refers to a divalent functional group derived from an alkyl group in which an aryl group is introduced.

The polyether-based segment refers to a repeat unit including an alkyl oxide (alkyl-O—) group, and it may be formed from a polyether-based resin or a precursor thereof that participates in a polymerization reaction.

The polyether-based segment may inhibit growth of large crystals in a tire inner liner film, or prevent the film from easily being broken in a tire manufacturing process or in an automobile running process. The polyether-based segment may further lower the modulus of the film for a tire inner liner or load generated when stretching, and thus allows the film to be stretched or deformed according to the shape of a tire with a small force when forming a tire, thereby easily forming a tire. The polyether-based segment may inhibit an increase in the stiffness of the film at a low temperature, prevent crystallization of the film at a high temperature, prevent damage or tearing of the inner liner film due to repeated deformations, and improve recovery to deformation of the inner liner to inhibit generation of wrinkles in the film due to permanent deformation, thereby improving durability of the tire or inner liner.

The polyether segment may be a main repeat unit that can be included in polyalkylene glycol resin or derivatives thereof, wherein the polyalkylene glycol derivative may be substituted with an amine group, a carboxyl group, or an isocyanate group at the end of the polyalkylene glycol resin. Preferably, the polyether segment may be a main repeat unit that is included in a polyether-based resin selected from the group consisting of polyethylene glycol, polypropylene glycol, polytetramethylene glycol, polyoxyethylene diamine, polyoxypropylene diamine, polyoxytetramethylene diamine, and copolymers thereof.

Specifically, the polyether-based segment may include a repeat unit of the following Chemical Formula 5.

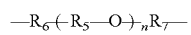  [Chemical Formula 5]

In Chemical Formula 3, $R_5$ is a C1-10 linear or branched alkylene group, and n is an integer of 1 to 100. $R_6$ and $R_7$ may be identical or different, and are independently a direct bond, —O—, —NH—, —COO—, or —CONH—.

The copolymer may include the polyamide-based segments and the polyether-based segments at a weight ratio of 7:3 to 3:7, or 6:4 to 3:7.

The resin mixture may include a polymer including polyamide-based segments and a polymer including polyether-based segments at a weight ratio of 7:3 to 3:7, or 6:4 to 3:7.

The base film of the film for a tire inner liner may further include a polyamide-based resin so as to improve mechanical properties or the gas barrier property. The polyamide-based resin may exist while it is mixed or copolymerized with the above-explained copolymer of polyamide-based segments and polyether-based segments. As described in the manufacturing method below, the polyamide-based resin may be mixed with the copolymer of polyamide-based segments and polyether-based segments, and then melted and extruded, and is thus included in the film for a tire inner liner.

The polyamide-based resin may exist on the film while it is mixed or copolymerized with the resin mixture of the polymer including polyamide-based segments and the polymer including polyether-based segments.

The polyamide-based resin that can be further included may be used so as to improve mechanical properties, for example, heat resistance or chemical stability and the gas barrier property of the film for a tire inner liner, but if it is excessively used, the properties of the manufactured film for a tire inner liner may be lowered. Particularly, even if the polyamide-based resin is further included, the content of the polyether-based segments should be maintained 5 wt % to 50, or 15 wt % to 45 wt % in the film, and thus the sum of the contents of the polyamide-based resin, the polyamide-based segments, other additives and the like should be 50 wt % to 95 wt %.

The polyamide-based resin that can be further included is not specifically limited, but it is preferable to use a polyamide-based resin including a repeat unit identical or similar to the polyamide-based segment so as to increase compatibility with the copolymer.

The polyamide-based resin may have relative viscosity (96% sulfuric acid solution) of 3.0 to 4.0, preferably 3.2 to 3.7. If the viscosity of the polyamide-based resin is less than 3.0, sufficient elongation may not be secured due to a decrease in toughness, and thus damage may be generated during a tire manufacturing process or automobile running, and the properties including the gas barrier property, formability, and the like required for a tire inner liner film may not be secured. If the viscosity of the polyamide-based resin is greater than 4.0, the modulus or viscosity of the manufactured inner liner film layer may become unnecessarily high, and the tire inner liner may not have appropriate formability or elasticity.

The relative viscosity of the polyamide-based resin refers to a relative viscosity measured using a 96% sulfuric acid solution at room temperature. Specifically, a specimen of polyamide-based resin (for example, a 0.025 g specimen) is dissolved in a 96% sulfuric acid solution at various concentrations to prepared two or more measurement solutions (for example, a polyamide-based resin specimen is dissolved in 96% sulfuric acid to concentrations of 0.25 g/dL, 0.10 g/dL, and 0.05 g/dL to prepare 3 measurement solutions), and then the relative viscosity of the measurement solutions (for example, the ratio of the average passing time of the measurement solutions to the passing time of the 96% sulfuric acid solution through a viscosity tube) may be obtained using a viscosity tube at 25° C.

The polyamide-based resin may include, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or a N-alkoxy alkylate thereof, for example, a methoxy methylate of 6-nylon, a methoxy methylate of 6-610-nylon, or a methoxy methylate of 612-nylon, and nylon 6, nylon 66, nylon 46, nylon 11, nylon 12, nylon 610, and nylon 612 may be preferably used.

The base film may include the polyamide-based resin and the copolymer or the mixture at a weight ratio of 7:3 to 3:7, or 6:4 to 3:7.

The base film layer may have a thickness of 30 μm to 300 μm, preferably 40 μm to 250 μm, and more preferably 40 μm to 200 μm. Thereby, the film for a tire inner liner according to one embodiment of the invention may have low air permeability, for example oxygen permeability of 200 cc/(m²·24 hr·atm) or less, while having a thin thickness, compared to those previously known.

Meanwhile, the film for a tire inner liner may further include an adhesive layer that is formed on at least one side of the base film, and includes a resorcinol-formalin-latex (RFL)-based adhesive. The adhesive layer including the resorcinol-formalin-latex (RFL)-based adhesive has excellent adhesion and adhesion maintaining performance to the base film layer and a tire carcass layer, and thus it may prevent breaking of an interface between an inner liner film and a carcass layer, which is generated by heat or repeated deformations in a tire manufacturing process or a running process, to afford sufficient fatigue resistance to the film for an inner liner.

It is considered that the main properties of the adhesive layer result from the inclusion of the resorcinol-formalin-latex (RFL)-based adhesive of a specific composition. Previously, as an adhesive for a tire inner liner, a rubber type of tie gum and the like was used, and thus an additional vulcanization process was required.

To the contrary, since the adhesive layer includes the resorcinol-formalin-latex (RFL)-based adhesive of a specific composition, it has high reactivity and adhesion to the base film, and it may be compressed under a high temperature heating condition to firmly adhere the base film to a carcass layer without significantly increasing the thickness. Thus, the weight of a tire may become lighter, the mileage of automobiles may be improved, and separation between a carcass layer and an inner liner layer or between the base film and the adhesive layer may be prevented even if deformations occur repeatedly in a tire manufacturing process or in an automobile running process.

Further, since the adhesive layer may exhibit high fatigue resistance to physical/chemical deformations that may be applied in a tire manufacturing process or an automobile running process, it may minimize lowering of adhesion or other properties in a manufacturing process of high temperature condition or in an automobile running process during which mechanical deformation is applied for a long time.

Furthermore, the resorcinol-formalin-latex (RFL)-based adhesive may exhibit good adhesion performance due to cross-linking between latex and rubber, it is physically a latex polymer and thus has a flexible property like rubber due to low hardness, and a methylol end group of the resorcinol-formalin polymer and a base film may be chemically bonded. Thus, if the resorcinol-formalin-latex (RFL)-based adhesive is applied to a base film, a film for a tire inner liner having sufficient adhesion performance and high elasticity may be provided.

The resorcinol-formalin-latex (RFL)-based adhesive may include 2 wt % to 32 wt %, preferably 10 wt % to 20 wt %, of a condensate of resorcinol and formaldehyde, and 68 wt % to 98 wt %, preferably 80 wt % to 90 wt % of a latex.

The condensate of resorcinol and formaldehyde may be obtained by mixing resorcinol and formaldehyde at a mole ratio of 1:0.3 to 1:3.0, preferably 1:0.5 to 1:2.5, and conducting condensation. The condensate of resorcinol and formaldehyde may be included in the content of 2 wt % or more based on total weight of the adhesive layer in terms of a chemical reaction for excellent adhesion, and it may be included in the content of 32 wt % or less so as to secure adequate fatigue resistance.

The latex may be selected from the group consisting of natural rubber latex, styrene/butadiene rubber latex, acrylonitrile/butadiene rubber latex, chloroprene rubber latex, and styrene/butadiene/vinylpyridine rubber latex, and a mixture thereof. The latex may be included in the content of 68 wt % or more based on total weight of the adhesive layer for flexibility and an effective cross-linking reaction with rubber, and it may be included in the content of 98 wt % or less for a chemical reaction with a base film and stiffness of the adhesive layer.

The adhesive layer may further include at least one additive such as a surface tension control agent, a heat resistant, an antifoaming agent, a filler, and the like, in addition to the condensate of resorcinol and formaldehyde. Although the surface tension control agent is applied for uniform coating of the adhesive layer, it may cause a decrease in adhesion when introduced in an excessive amount, and thus it may be included in the content of 2 wt % or less, or 0.0001 wt % to 2 wt %, preferably 1.0 wt % or less, or 0.0001 wt % to 0.5 wt %, based on total weight of the adhesive. The surface tension control agent may be selected from the group consisting of a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The adhesive layer may have a thickness of 0.1 μm to 20 μm, preferably 0.1 μm to 10 μm, more preferably 0.2 μm to 7 μm, sand till more preferably 0.3 μm to 5 μm, and it may be formed on at least one surface of a film for a tire inner liner. If the thickness of the adhesive layer is too thin, the adhesive layer itself may become thinner when a tire is inflated, cross-linking adhesion between a carcass layer and a base film may be lowered, and stress may be concentrated on a part of the adhesive layer to lower the fatigue property. If the thickness of the adhesive layer is too thick, interface separation may occur in the adhesive layer to lower fatigue property. To adhere the inner liner film to a carcass layer of a tire, an adhesive layer is generally formed on one side of the base film, but in case a multi-layered inner liner film is applied, or adhesion to rubber on both sides is required according to a tire forming method and construction design, for example when an inner liner film covers a bead part, the adhesive layer may be preferably formed on both sides of the base film.

According to another embodiment of the invention, provided is a method for manufacturing the film for a tire inner liner, including melting and extruding a raw material for a base film to form a base film having a width (TD) of 1000 mm or more in the transverse direction, and orienting the base film such that the total draft in the machine direction becomes 6 to 20.

According to the embodiment, in the manufacturing process of the base film, the transverse direction (TD) of the film is in the undrawn state and has a width above a certain width, and the machine direction of the base film is oriented to a total draft of 6 to 20.

The embodiment is based on the discovery that when the film for a tire inner liner is practically applied to a tire manufacturing process, the machine direction (MD) of the base film of the manufactured inner liner film may be applied to the radial direction (width direction) of a tire and the transverse direction (TD) of the base film may be applied to the circumferential direction of a tire, and thus the manufactured tire may have slight difference in physical properties and shape over all directions, particularly between the radial direction and the circumferential direction of a tire, thus exhibiting uniform and excellent physical properties, and excellent durability and fatigue resistance may be secured in a tire manufacturing process or in an automobile running process.

Specifically, the strength ratio of the machine direction (MD) and the transverse direction (TD) of the base film may be 1.1:1 to 2:1, preferably 1.2:1 to 1.6:1.

In the step of melting and extruding the raw material for a base film to form a base film having a length of the transverse direction (TD) of 1000 mm or more, melted polymer is uniformly attached to a cooling roll using an air knife or an edge-pinning device and cooled, and thus width shrinkage in the transverse direction (TD) due to the elastomeric property may be controlled, thereby manufacturing a base film having a width of the transverse direction (TD) of 1000 mm or more.

In the step of orienting the base film such that total draft in the machine direction becomes 6 to 20, the orientation of the machine direction (MD) of the base film may be adjusted by controlling the discharge speed of the raw material in a die to control the melt draft ratio in an extrusion die, or by controlling the draw ratio after the extrusion die, that is, the draw ratio in all driving rolls including a casting roll to a winder, which exists when the base film is manufactured, and the draw ratio generated in a driving roll in the step of coating the manufactured base film.

Specifically, the total draft in the machine direction may be a value obtained by multiplying the melt draft ratio in an extrusion die of the following Equation 1 and the draw ratio after the extrusion die.

Melt draft ratio in an extrusion die=speed of a casting roll(m/min)/discharge speed of raw material in a die(m/min) [Equation 1]

The melt draft ratio in an extrusion die means drawing with a speed difference between the discharge speed (V0) of the raw material in the extrusion die and the casting-roll speed (V1). The discharge speed of the raw material in the die may be calculated by the following Equation 2.

Discharge speed of raw material in a die(m/min)={discharge amount of raw material from a die($Q$)/[density of raw material($\rho$)*effective discharge area of raw material from a die ($A$)]}/100 [Equation 2]

In the Equation 2, Q has the unit of g/min, $\rho$ has the unit of $g/cm^2$, and A has the unit of $cm^2$.

The draw ratio after the extrusion die may be a value obtained by multiplying the draw ratio in all driving rolls including a casting roll to a winder, which exist when the base film is manufactured, and the draw ratio generated in a driving roll in the step of coating the manufactured base film.

The draw ratio in all driving rolls including a casting roll to a winder, which exist when the base film is manufactured, may be a value obtained by multiplying draw ratios generated between neighboring rolls among the casting roll and driving rolls installed after the casting roll. If drawing is not generated between the two driving rolls, the corresponding draw ratio is 1.

Specifically, the draw ratio after the extrusion die may be a value obtained by multiplying the draw ratio generated in the step of manufacturing a base film and the draw ratio generated in the step of forming an adhesive layer as described below. In case drawing is not generated in the step of forming an adhesive layer, the corresponding draw ratio is 1.

The draw ratio after the extrusion die may be defined by the following Equation 3.

Draw ratio after extrusion die=draw ratio generated in the step of manufacturing a base film*draw ratio generated in the step of forming an adhesive layer [Equation 3]

Meanwhile, as the raw material for a base film, previously known butyl rubber, synthetic rubber, a polyamide-based resin, and the like may be used. However, in order to realize an excellent gas barrier property with a thin thickness to make the weight of a tire light, improve automobile mileage, and afford excellent formability and mechanical properties, the base film may include (i) a copolymer including polyamide-based segments and polyether-based segments, or (ii) a mixture of resins of a polymer including polyamide-based segments and polymer including polyether-based segments.

More preferably, the content of the polyether-based segments of the copolymer or the content of the polymer including polyether-based segments may be 5 wt % to 50 wt %, or 15 wt % to 45 wt %, based on the total weight of the base film.

Specifically, the step of forming a base film may include melting and extruding the above-explained copolymer or mixture at 230° C. to 300° C. to form a film having a thickness of 30 μm to 300 μm.

As an extrusion die for melting and extruding the mixture, those known to be usable for extrusion of a polymer resin may be used without specific limitations, but it is preferable to use a T-type die so as to make the thickness of the base film uniform or make the viscosity property uniform through a uniform residence time in a die.

In the step of forming a base film, the mixture may be melted and extruded to form a base film having a thickness of 30 μm to 300 μm. The thickness of the manufactured film may be controlled by controlling extrusion conditions, for example, the discharge rate of an extruder or the speed of a casting roll.

The step of melting and extruding raw material for a base film to form a base film having a width of 1000 mm or more in the transverse direction (TD) may include melting and extruding the raw material for a base film in an extrusion die having a die gap of 0.3 mm to 1.5 mm.

To control the thickness of the manufactured base film layer more uniformly, the die gap of the extrusion die may be controlled to 0.3 mm to 1.5 mm. In the step of forming the base film, if the die gap is too small, shear pressure and shear stress in the melt-extrusion process may become too high, and thus uniform shape of the extruded film may not be formed and productivity may be lowered. Further, if the die gap is too large, drawing of the melt extruded film may largely occur to generate an orientation, and physical properties of the manufactured base film may become non-uniform.

Furthermore, in the manufacturing method of the film for a tire inner liner, the thickness of the manufactured base film may be continuously measured, and the measurement result is fed back to control the part of the extrusion die where non-uniform thickness appears, for example, a lip gap adjustment bolt of T-die, thus reducing deviation of the manufactured base film, thereby obtaining a film having a more uniform thickness. The measurement of the film thickness-feed back-control of extrusion die may constitute an automated process step by using an automated system, for example, an Auto Die system and the like.

In the step of forming the base film, except for the above-explained steps and conditions, film extrusion conditions commonly used for manufacturing of a polymer film, for example, screw diameter, screw rotation speed, line speed, and the like may be appropriately selected.

The method for manufacturing a film for a tire inner liner may further include solidifying the base film formed by melting and extrusion in a casting roll of a cooling part maintained at a temperature of 5° C. to 40° C., and preferably 10° C. to 30° C.

As the base film layer formed by melting and extrusion is solidified in a casting roll of a cooling part maintained at a temperature of 5° C. to 40° C., a film having more uniform thickness may be provided. By adhering the base film layer by melting and extrusion to the casting roll of a cooling part maintained at an optimum temperature, the physical properties of the machine direction and the transverse direction of the base film may be uniformized by substantially uniform cooling, and uniform drawing may be enabled in the subsequent drawing process.

Specifically, the solidifying step may include uniformly attaching the base film formed through melting and extrusion to a casting roll in a cooling part maintained at a temperature of 5° C. to 40° C., using an air knife, an air nozzle, an electrostatic charging device (pinning device), or a combination thereof.

Meanwhile, the melted material extruded under the specific die gap conditions may be attached or folded to a cooling roll installed at a horizontal distance of 10 mm to 150 mm, preferably 20 mm to 120 mm from the die outlet, to eliminate drawing and orientation. The horizontal distance from the die outlet to the cooling roll may be a distance between the die outlet and a point where discharged melted material is folded to the cooling roll.

By adhering the base film layer formed by melting and extrusion to the casting roll of a cooling part using an air knife, an air nozzle, a pinning device, or a combination thereof in the solidification step, blowing or partially non-uniform cooling of the base film layer after extrusion may be prevented, and thus a film having more uniform thickness may be formed, and areas that are thicker or thinner than surrounding areas may not be substantially formed in the film.

The raw material for a base film may further include a polyamide-based resin, and preferably, it may include a polyamide-based resin and a copolymer or a resin mixture at a weight ratio of 7:3 to 3:7, or 6:4 to 3:7.

As explained above, the copolymer may include polyamide-based segments and polyether-based segments at a weight ratio of 7:3 to 3:7, or 6:4 to 3:7. The resin mixture may include the polymer including the polyamide-based segments and the polymer including the polyether-based segments at a weight ratio of 7:3 to 3:7, or 6:4 to 3:7.

The details of the polyamide-based resin, the copolymer including the polyamide-based segments and the polyether-based segments, or the resin mixture including the polymer including the polyamide-based segments and the polymer including polyether-based segments are as explained above.

In order to orient the base film in the machine direction (MD), the discharge speed of the raw material for a base film that is primarily discharged from the die may be changed by adjusting the die gap, the die width, and the discharged amount, thereby orienting in a melted state by a speed difference between a casting roll of a cooling part. The melt draft ratio in an extrusion die of Equation 1 may be 4 to 19.05, or 4 to 14, and preferably 5 to 10.

If the melt draw ratio in an extrusion die of Equation 1 is too low, the discharged state of the raw material for a base film may become poor, and uniformity of the manufactured base film may be lowered. If the melt draw ratio in an extrusion die of the Equation 1 is too high, the physical properties of the manufactured base film may become non-uniform, and adhesion to a casting roll of a cooling part may be lowered, thus making uniform cooling difficult.

The step of orienting the base film such that total draft in the machine direction may become 6 to 20 may include drawing the base film such that draw ratio after the extrusion die may become 1.05 to 1.5.

In the manufacturing process of a base film, by changing the speed of some or all rolls while the melted and extruded product reaches a casting roll of a cooling part to a winder, additional orientation of the base film in the machine direction (MD) may be generated by a peripheral speed difference.

The draw ratio after the extrusion die may be 1.05 to 1.5, preferably 1.1 to 1.3. If the draw ratio after the extrusion die is too low, the orientation effect may be lowered, and if it is too high, blocking may be generated due to high tension when the base film is wound in a winder, which causes breakage of the film in the coating step, and thus it is difficult to be applied for a practical process.

Meanwhile, the method for manufacturing a film for a tire inner liner may further include coating a resorcinol-formalin-latex (RFL)-based adhesive on at least one surface of the base film to a thickness of 0.1 μm to 20 μm.

The step of forming the adhesive layer may be progressed by coating the resorcinol-formalin-latex (RFL)-based adhesive on one side or both sides of the base film, and then drying it. The formed adhesive layer may have a thickness of 0.1 μm to 20 μm, preferably 0.1 μm to 10 μm. The resorcinol-formalin-latex (RFL)-based adhesive may include 2 wt % to 32 wt % of a condensate of resorcinol and formaldehyde, and 68 wt % to 98 wt %, preferably 80 wt % to 90 wt %, of latex. That is, the step of forming the adhesive layer may include coating an adhesive including 2 wt % to 30 wt % of a condensate of resorcinol and formaldehyde, and 69 wt % to 98 wt % of a latex, on at least one surface of the base film layer to a thickness of 0.1 μm to 20 μm.

The details of the resorcinol-formalin-latex (RFL)-based adhesive with the above specific composition are as explained above.

Commonly used coating methods or apparatuses may be used to coat the adhesive without specific limitations, but knife coating, bar coating, gravure coating, spraying, or immersion may be used. However, knife coating, gravure coating, or bar coating may be preferable for uniform coating of the adhesive.

After forming the adhesive layer on one side or both sides of the base film, drying and an adhesive reaction may be simultaneously progressed, but a heat treatment reaction step may be progressed after the drying step considering reactivity of the adhesive, and the step of forming the adhesive layer and drying and reacting may be applied several times for a desired thickness of the adhesive layer or application of a multi-layered adhesive. After coating the adhesive on the base film, a heat treatment reaction may be conducted by solidifying and reacting at 100° C. to 150° C. for approximately 30 seconds to 3 minutes.

Meanwhile, as explained above, in the coating step of the base film, a peripheral speed difference may between some or all rolls from a coating roll to a winder to additionally orient in the machine direction of the base film, wherein a draft by draw ratio may be 1.0 to 1.5, preferably 1.1 to 1.3.

If the draft is too low, coating of the coating solution may become non-uniform, thus lowering adhesion to the rubber, and if it is too high, a coating line may be generated in the machine direction of the base film due to an increase in tension, making adhesion to rubber non-uniform.

In the step of orienting in the machine direction of the base film to a total draft of 6 to 20, the adding of a draft may be conducted at any time after the base film layer is formed.

According to yet another embodiment of the invention, a method for manufacturing a film for a tire inner liner is provided, including: melting and extruding a raw material for a base film to form a base film; drawing the base film 5% to 50% in the transverse direction; and forming an adhesive layer on at least one side of the base film, wherein the strength ratio of the machine direction (MD) and the transverse direction (TD) of the base film is 1:1.1 to 1:2.

The embodiment is based on the discovery that a film for a tire inner liner manufactured by drawing 5% to 50% in the transverse direction (TD) of the film may exhibit a slight difference in the physical properties and the shape over all directions, particularly between the radial direction and the circumferential direction of a tire when applied to a tire manufacturing process, exhibit excellent physical properties, and secure excellent durability and fatigue resistance in a tire manufacturing process or in an automobile running process. Specifically, the strength ratio of the transverse direction and the machine direction of the base film may be 1.1:1 to 2:1, preferably 1.2:1 to 1.6:1.

The machine direction of the base film means a direction in which the base film is formed in the manufacturing process of a film for a tire inner liner, and the transverse direction of the base film means a direction perpendicular to the machine direction.

The product obtained by melting and extruding raw material for a base film may have a width of 500 mm or more in the transverse direction.

The step of drawing the base film 5% to 50% in the transverse direction may be conducted at 80° C. to 250° C., and preferably 100° C. to 200° C.

The sequence of the step of drawing the base film 5% to 50% in the transverse direction and the step of forming an adhesive layer on at least one side of the base film is not specifically limited, the drawing step may be first, or the adhesive layer forming step may be first, but it is preferable that the two steps are conducted through a single process or step for easier drawing and process efficiency.

The step of drawing the base film 5% to 50% in the transverse direction (TD) may be conducted simultaneously with the step of forming an adhesive layer on the base film, and after coating the adhesive, the base film may be drawn in the transverse direction (TD) while passing through a heat treatment oven at 80° C. to 250° C. equipped with a hydrodynamic or mechanical grip on a caterpillar rail.

The method for manufacturing a film for a tire inner liner may further include heat treating the base film at a temperature of 100° C. to 180° C. before the drawing step; or heat treating the base film that is drawn 5% to 50% at a temperature of 100° C. to 180° C. after the drawing step.

Specifically, drawing in the transverse direction may be conducted in all sections of the heat treatment oven, but it is preferable for drawing uniformity that the length of the total heat treatment oven is divided into 3 sections, wherein the first section is used as a section for preheating the film, the film is multi-step drawn in the transverse direction in the second section, and shape fixing of the film and heat treatment of the adhesive layer are completed in the third section. At this time, it is preferable that the coating of the adhesive and drawing in the heat treatment oven are completed within 3 minutes, considering processibility and thermal degradation of the film, and the coating of the adhesive and drawing in the transverse direction may be conducted repeatedly as necessary.

Meanwhile, as the raw material for a base film, previously known butyl rubber, synthetic rubber, polyamide-based resin, and the like may be used. However, in order to realize an excellent gas barrier property with a thin thickness to make the weight of a tire light, improve automobile mileage, and afford excellent formability and mechanical properties, the base film may include the copolymer including polyamide-based segments and polyether-based segments; or a resin mixture of polymer including polyamide-based segments and polymer including polyether-based segments.

More preferably, the content of the polyether-based segments of the copolymer or the content of the polymer including the polyether-based segments may be 5 wt % to 50 wt %, or 15 wt % to 45 wt %, based on the total weight of the base film.

Specifically, the step of forming a base film may include melting and extruding the above-explained copolymer or mixture at 230° C. to 300° C. to form a film having a thickness of 30 μm to 300 μm.

As the extrusion die for melting and extruding the mixture, those known to be usable for the extrusion of a polymer resin may be used without specific limitations, but it is preferable to use a T-type die so as to make the thickness of the base film uniform or make the viscosity property uniform through uniform residence time in the die.

In the step of forming a base film, the mixture is melted and extruded to form a base film having a thickness of 30 μm to 300 μm. The thickness of the manufactured film may be controlled by controlling extrusion conditions, for example, the discharge rate of an extruder or the speed of a casting roll.

Furthermore, in the manufacturing method of the film for a tire inner liner, the thickness of the manufactured base film may be continuously measured, and the measurement result is fed back to control the part of the extrusion die where non-uniform thickness appears, for example, lip gap adjustment bolt of T-die, thus reducing deviation of the manufactured base film, thereby obtaining a film having a more uniform thickness. The measurement of the film thickness-feed back-control of extrusion die may constitute an automated process step by using automated system, for example the Auto Die system, and the like.

In the step of forming the base film, except for the above-explained steps and conditions, film extrusion conditions commonly used for manufacturing of a polymer film, for example, screw diameter, screw rotation speed, line speed, and the like may be appropriately selected.

Meanwhile, the manufacturing method of the film for a tire inner liner may further include a step of solidifying the base film layer formed through melting and extrusion in a cooling part maintained at a temperature of 5° C. to 40° C., preferably 10° C. to 30° C.

By solidifying the base film layer formed through melting and extrusion in a cooling part maintained at a temperature of 5° C. to 40° C., a film with a more uniform thickness may be provided. If the base film layer formed through melting and extrusion is folded or attached to a cooling part maintained at the appropriate temperature, orientation may not substantially occur, and the base film layer may be provided as an undrawn film. Specifically, the solidifying step may include uniformly attaching the base film formed through melting and extrusion to a casting roll in a cooling part maintained at a temperature of 5° C. to 40° C., using an air knife, an air nozzle, an electrostatic charging device (pinning device), or a combination thereof.

In the solidifying step, by attaching the base film formed through melting and extrusion to a cooling roll using an air knife, an air nozzle, an electrostatic charging device (pinning device), or a combination thereof, blowing of the base film layer after extrusion or partially non-uniform cooling, and the like may be prevented, and thus a film having a more uniform thickness may be formed, and areas having a relatively thick or thin thickness compared to the surrounding parts in the film may not be substantially formed.

The raw material for a base film may further include a polyamide-based resin, and preferably, the raw material for a base film may include the polyamide-based resin and the copolymer or the mixture at a weight ratio of 7:3 to 3:7, or 6:4 to 3:7.

As explained above, the copolymer may include polyamide-based segments and polyether-based segments at a weight ratio of 7:3 to 3:7, or 6:4 to 3:7. Further, the weight ratio of the polymer including the polyamide-based segments and the polymer including polyether-based segments may be 7:3 to 3:7, or 6:4 to 3:7.

The details of the polyamide-based resin, the copolymer including the polyamide-based segments and the polyether-based segments, or the mixture of the polymer including the polyamide-based segments and the polymer including polyether-based segments are as explained above.

Meanwhile, the method for manufacturing a film for a tire inner liner may further include coating a resorcinol-formalin-latex (RFL)-based adhesive on at least one side of the base film to a thickness of 0.1 µm to 20 µm.

The step of forming the adhesive layer may be progressed by coating the resorcinol-formalin-latex (RFL)-based adhesive on one side or both sides of the base film, and then drying it. The formed adhesive layer may have a thickness of 0.1 µm to 20 µm, and preferably 0.1 µm to 10 µm. The resorcinol-formalin-latex (RFL)-based adhesive may include 2 wt % to 32 wt % of a condensate of resorcinol and formaldehyde, and 68 wt % to 98 wt %, and preferably 80 wt % to 90 wt %, of latex. That is, the step of forming the adhesive layer may include coating an adhesive including 2 wt % to 30 wt % of a condensate of resorcinol and formaldehyde and 69 wt % to 98 wt % of a latex on at least one surface of the base film layer to a thickness of 0.1 µm to 20 µm.

The details of the resorcinol-formalin-latex (RFL)-based adhesive with the above specific composition are as explained above.

Commonly used coating methods or apparatuses may be used to coat the adhesive without specific limitations, but knife coating, bar coating, gravure coating or spray, or immersion may be used. However, knife coating, gravure coating, or bar coating may be preferable for uniform coating of the adhesive.

After forming the adhesive layer on one side or both sides of the base film, drying and an adhesive reaction may be simultaneously progressed, but a heat treatment reaction step may be progressed after drying step considering reactivity of the adhesive, and the step of forming the adhesive layer and drying and reacting may be applied several times for a specific thickness of the adhesive layer or application of a multi-layered adhesive. After coating the adhesive on the base film, a heat treatment reaction may be conducted by solidifying and reacting at 100° C. to 150° C. for approximately 30 seconds to 3 minutes.

Meanwhile, according to yet another embodiment, a pneumatic tire manufactured using the above-explained film for a tire inner liner is provided.

As explained above, if the base film of the film for a tire inner liner is oriented such that total draft in the machine direction becomes 6 to 20, and then the machine direction (MD) of the base film is applied to the radial direction (width direction) of a tire and the transverse direction (TD) of the base film is applied to the circumferential direction, the film for a tire inner liner may exhibit excellent physical properties over all directions, and excellent durability and fatigue resistance may be secured in a tire manufacturing process or in an automobile running process.

A film for a tire inner liner including a base film that is drawn or oriented in a first direction, and is in the undrawn state in a second direction perpendicular to the first direction, wherein the strength ratio of the first direction and the second direction of the base film is 1.1:1 to 2:1, may be applied in a tire manufacturing process such that the first direction becomes parallel to the width direction of a tire forming drum for manufacturing a pneumatic tire (the radial direction of a tire; the width direction of a tire). If the film for a tire inner liner having the above properties is applied in the above direction to manufacture a tire, the film for a tire inner liner may exhibit excellent physical properties over all directions in the tire, and excellent durability and fatigue resistance may be secured in a tire manufacturing process or in an automobile running process.

Specifically, the strength ratio of the first direction and the second direction of the base film of the film for a tire inner liner may be 1.1:1 to 2:1. Thereby, the film for a tire inner liner may not significantly generate orientation in a specific direction in a tire manufacturing process, the finally manufactured tire may exhibit uniform thickness and physical properties over all directions, and the elasticity may not be significantly lowered, and thus generation of crystals in the film or tearing in a specific direction may be prevented.

Since the strength ratio of the first direction and the second direction of the base film of the film for a tire inner liner is 1.1:1 to 2:1, preferably 1.2:1 to 1.6:1, an inner liner that does not have a difference in thickness or physical properties in a specific direction in the finally manufactured tire may be formed, and mechanical properties, durability, and fatigue resistance required in a tire manufacturing process or in an automobile running process may be secured.

Meanwhile, according to yet another embodiment of the invention, a method for manufacturing a pneumatic tire is provided, including mounting a side having higher strength among two neighboring sides of a film for a tire inner liner on a tire forming drum in a horizontal direction to the width direction of the forming drum.

The film for a tire inner liner may be manufactured by melting and extruding a raw material for a base film to form a base film having a width of 1000 mm or more in the transverse direction (TD), and orienting the base film such that total draft in the machine direction becomes 6 to 20. In this case, the strength ratio of the machine direction and the transverse direction of the base film of the film for a tire inner liner may be 1.1:1 to 2:1.

The film for a tire inner liner obtained by the manufacturing method of a film for a tire inner liner is cut to a size of a tire, and a pneumatic tire may be manufactured by mounting the film on a tire forming drum in the horizontal direction to the width direction of the forming drum, such that the machine direction of the base film becomes the radial direction of a tire.

The film for a tire inner liner may be manufactured by melting and extruding a raw material for a base film to form a base film, drawing the base film 5% to 50% in the transverse direction, and forming an adhesive layer on at least one side of the base film. In this case, the strength ratio of the transverse direction and the machine direction of the base film of the film for a tire inner liner may be 1.1:1 to 2:1.

In this case, a pneumatic tire may be manufactured by mounting the film for a tire inner liner obtained by the above-explained manufacturing method of a film for a tire inner liner on a tire forming drum in a horizontal direction to the width direction of the forming drum, such that the transverse direction of the base film becomes the radial direction of a tire.

In the manufacturing method of a pneumatic tire, methods, conditions, and apparatuses commonly used in the manufacturing method of a pneumatic tire may be used without specific limitations, except that a release film is removed from the laminate for manufacturing a tire.

Specifically, the method for manufacturing a pneumatic tire may further include: laminating a body ply layer on the inner liner film on a tire forming drum; attaching a bead wire to the end of the body ply layer in the width direction of the forming drum; forming a belt part on the body ply layer mounted on the tire forming drum; forming a cap ply part on the belt part; and forming a rubber layer for the formation of a thread part, a shoulder part and a side wall part on the belt part.

Meanwhile, according to yet another embodiment of the invention, a method for manufacturing a pneumatic tire is provided, including: melting and extruding a raw material for an inner liner film to form an inner liner film; and positioning the inner liner film on a tire forming drum such that the machine direction (MD) forms an angle with the longitudinal direction of the tire forming drum of 0° or more and less than 90°.

The embodiment is based on the discovery that if an inner liner film is applied such that the machine direction of the manufactured inner liner film, that is, the direction in which melted and extruded raw material is formed into a film in the manufacturing device, forms an angle with the axial direction of a tire forming drum of 0° or more and less than 90°, the inner liner film may have uniform and excellent physical properties over all directions and may be stably located in a tire, and a pneumatic tire manufactured by the method may realize excellent mechanical properties, durability, and fatigue resistance in a tire manufacturing process or in an automobile running process.

During tire forming and manufacturing processes such as forming by air instillation or vulcanization at a high temperature and the like, the physical properties of the inner liner are changed to some degree, and particularly, deformation degrees between the radial direction and the circumferential direction of a tire become significantly different in the stretching and deformation processes at a high temperature. That is, in general, the deformation rate in the circumferential direction of a tire is much higher than that in the radial direction of a tire, and thus a difference in the deformation of the shape or physical properties is significantly generated between the two directions. Thus, the inner liner included in the finally manufactured tire may have non-uniform thickness or physical properties according to the direction.

Particularly, during an extrusion process or transfer and winding process using a roll in the manufacturing process of an inner liner film, drawing or orientation is generated to some degree in the machine direction. Previously, the inner liner was mounted on a forming drum and processed such that the machine direction (MD) of the inner liner is perpendicular to the axis of the forming drum (that is, the machine direction (MD) of the inner liner overlaps the circumferential direction of a tire), and thus a difference in the deformation degrees of physical properties and shape between the circumferential direction and the radial direction of a tire became larger in the inner liner.

Further, since external stress is concentrated on the parts drawn or oriented in the machine direction during a deformation or forming step in a tire manufacturing process, physical properties of the inner liner may be lowered or the film itself may be damaged or broken, and the inner liner may be split along the machine direction, and thus it may be difficult to secure durability and fatigue resistance required in a tire.

Thus, a method of changing the process conditions or the design of the manufacturing process has been suggested in order to minimize the drawing or orientation of the inner liner film in the machine direction. However, it is not easy to substantially remove drawing or orientation in a specific direction in the inner liner film, and complicated process steps should be applied.

To the contrary, in the manufacturing method of a pneumatic tire of one embodiment of the invention, as explained above, by positioning the inner liner film on a forming drum such that the machine direction of the manufactured inner liner film forms an angle with the axial direction of the tire forming drum of 0° or more and less than 90°, the problems that were difficult to overcome by previously known methods can be almost overcome, and a pneumatic tire having more uniform and excellent mechanical properties, durability, and fatigue resistance can be provided.

The angle formed by the machine direction (MD) of the inner liner film with the axial direction of the tire forming drum may be less than 90°, for example, 0° or more and less than 90°, preferably 0° or more and 60° or less, or 0° or more and 50° or less, or 0° or more and 30° or less.

That is, in the manufacturing method of a pneumatic tire of the embodiment, unlike previously known methods, the inner liner film is applied at a specific angle, so that the inner liner film may have uniform and excellent physical properties over all directions and may be stably located in the manufactured tire, and the manufactured pneumatic tire may exhibit excellent mechanical and physical properties, durability, and fatigue resistance in a tire manufacturing process or in an automobile running process.

The lengths of the machine direction and the transverse direction of the inner liner film may be determined according to the properties or size of a pneumatic tire to be manufactured, and since the inner liner film is applied such that the machine direction (MD) forms an angle with the axial direction of a tire forming drum of 0° or more and less than 90°, the length of the transverse direction (TD) may be 1000 mm or more.

Further, the manufactured inner liner film may be cut in the transverse direction and mounted on a tire forming drum as explained above. That is, the manufacturing method of a pneumatic tire may further include cutting the inner liner film in the transverse direction (TD).

Meanwhile, the step of forming an inner liner film may include melting and extruding raw material for the inner liner film at 230° C. to 300° C. to form a film having a thickness of 30 µm to 300 µm.

As the extrusion die for melting and extruding raw material for the inner liner film, those known to be usable for the extrusion of a polymer resin may be used without specific limitations, but it is preferable to use a T-type die so as to make the thickness of the inner liner film uniform or make the viscosity property uniform through uniform residence time in the die.

In the step of forming an inner liner film, the raw material is melted and extruded to form an inner liner film having a thickness of 30 µm to 300 µm. The thickness of the manufactured inner liner film may be controlled by controlling extrusion conditions, for example, discharge rate of an extruder or speed of a casting roll.

Furthermore, in the manufacturing method of an inner liner film, the thickness of the manufactured inner liner film may be continuously measured, and the measurement result is fed back to control the part of the extrusion die where non-uniform thickness appears, for example, lip gap adjustment bolt of a T-type die, thus reducing deviation of the manufactured base film, thereby obtaining a film having a more uniform thickness. The measurement of the film thickness-feed back-control of extrusion die may constitute an automated process step by using an automated system, for example the Auto Die system and the like.

In the step of forming the inner liner film, except for the above-explained steps and conditions, film extrusion conditions commonly used for manufacturing of a polymer film, for example, screw diameter, screw rotation speed, line speed, and the like may be appropriately selected.

Meanwhile, as the raw material for an inner liner film, previously known butyl rubber, synthetic rubber, polyamide-based resin, and the like may be used. However, in order to realize an excellent gas barrier property with a thin thickness to make the weight of a tire light, improve automobile mileage, and afford excellent formability and mechanical properties, the inner liner film may include a copolymer including polyamide-based segments and polyether-based segments, or a resin mixture of a polymer including polyamide-based segments and a polymer including polyether-based segments. More preferably, the content of the polyether-based segments of the copolymer or the content of the polymer including the polyether-based segments may be 5 wt % to 50 wt %, or 15 wt % to 45 wt %, based on the total weight of the inner liner film.

The polyamide-based segment refers to a repeat unit including an amide group (—CONH—), and it may be formed from a polyamide-based resin or a precursor thereof that participates in a polymerization reaction.

Since the polyamide-based segment has sufficient heat resistance and chemical stability, it may prevent deformation or degradation of an inner liner film when exposed to chemical substances such as additives or high temperature conditions that are applied in a tire manufacturing process. As the polyamide-based segments are copolymerized with polyether-based segments, the inner liner film may have relatively high reactivity to an adhesive (for example, a resorcinol-formalin-latex (RFL)-based adhesive), and thus the inner liner film may be easily adhered to a carcass part.

The details of the polyamide-based segments are as explained above in other embodiments of the invention. For example, the polyamide-based segment may include a repeat unit of the following Chemical Formula 1 or Chemical Formula 2.

The details of the polyether-based segments are as explained above in other embodiments of the invention. For example, the polyether-based segment may include a repeat unit of the following Chemical Formula 5.

The above-explained copolymer may include the polyamide-based segments and the polyether-based segments at a weight ratio of 7:3 to 3:7, or 6:4 to 3:7.

Further, the weight ratio of the polymer including the polyamide-based segments and the polymer including the polyether-based segments may be 7:3 to 3:7, or 6:4 to 3:7.

Meanwhile, the inner liner film may further include a polyamide-based resin so as to improve mechanical properties or the gas barrier property. The polyamide-based resin may exist while it is mixed or copolymerized with the copolymer of the polyamide-based segments and the polyether-based segments or the mixture of the polymer including the polyamide-based segments and the polymer including the polyether-based segments.

The details of the polyamide-based resin are as explained above in other embodiments of the invention. For example, the polyamide-based resin may have relative viscosity (96% sulfuric acid solution) of 3.0 to 4.0, preferably 3.2 to 3.7.

In case the inner liner film further includes the polyamide-based resin, the inner liner film may include the polyamide-based resin and the copolymer or the mixture at a weight ratio of 7:3 to 3:7, or 6:4 to 3:7.

Meanwhile, the step of forming an inner liner film may further include solidifying the melted and extruded product in a cooling part maintained at a temperature of 5° C. to 40° C., preferably 10° C. to 30° C.

By solidifying the product obtained by melting and extrusion in a cooling part maintained at temperature of 5° C. to 40° C., a film with a more uniform thickness may be provided. Specifically, the solidifying step may include uniformly attaching the base film formed through melting and extrusion to a casting roll in a cooling part maintained at a temperature of 5° C. to 40° C., using an air knife, an air nozzle, an electrostatic charging device (pinning device), or a combination thereof.

In the solidifying step, by attaching the base film formed through melting and extrusion to a cooling roll using an air knife, an air nozzle, an electrostatic charging device (pinning device), or a combination thereof, blowing of the base film layer after extrusion, partially non-uniform cooling, and the like may be prevented, and thus a film having a more uniform thickness may be formed, and areas having a relatively thick or thin thickness compared to the surrounding parts in the film may not be substantially formed.

Meanwhile, the manufacturing method of a pneumatic tire may further include a step of forming an adhesive layer on at least one side of the inner liner film. The adhesive layer may include a resorcinol-formalin-latex (RFL)-based adhesive and have a thickness of 0.1 µm to 20 µm.

The details of the composition of the resorcinol-formalin-latex (RFL)-based adhesive and the forming method of the adhesive layer are as explained above in other embodiments of the invention.

After forming the adhesive layer on one side or both sides of the inner liner film, drying and an adhesive reaction may be simultaneously progressed, but a heat treatment reaction step may be progressed after the drying step considering reactivity of the adhesive, and the step of forming the adhesive layer and drying and reacting may be applied several times for a specific thickness of the adhesive layer or application of a multi-layered adhesive. After coating the adhesive on the inner liner film, a heat treatment reaction may be conducted by solidifying and reacting at 100° C. to 150° C. for approximately 30 seconds to 3 minutes.

In the manufacturing method of a pneumatic tire, methods, conditions, and apparatuses commonly used in a manufacturing method of a pneumatic tire may be used without specific limitations, except the above explained contents.

Specifically, the method for manufacturing a pneumatic tire may further include: laminating a body ply layer on the inner liner film on the tire forming drum; attaching a bead wire to the end of the body ply layer in the width direction of the forming drum; forming a belt part on the body ply layer mounted on the tire forming drum; forming a cap ply part on the belt part; and forming a rubber layer for the formation of a thread part, a shoulder part, and a side wall part on the belt part, after positioning (applying) the inner liner film such that the machine direction (DM) forms an angle with the axial direction of a tire forming drum of 0° or more and less than 90°.

The method for manufacturing a pneumatic tire may further include stretching the laminated body, for example, the laminated body including the inner liner film, body ply layer, bead wire, belt part, cap ply part, and rubber layer, on the tire forming drum at 100° C. to 200° C.

The method for manufacturing a pneumatic tire may further include forming a pattern on the external surface, that is, on the thread part, shoulder part, and side wall part of the laminated body stretched at 100° C. to 200° C. The pattern formed on the thread part may determine the properties of a tire, and on the shoulder part and the side wall part, patterns showing the dimensions or trademark and the like of a tire may be formed.

Advantageous Effect of the Invention

According to the present invention, a film for a tire inner liner film that may exhibit uniform excellent physical properties over all directions when applied to a tire, and may secure excellent durability and fatigue resistance in a tire manufacturing process or in an automobile running process, a method for manufacturing the film for a tire inner liner, a pneumatic tire using the tire inner liner film, and a method for manufacturing the pneumatic tire using the tire inner film may be provided.

Thus, the inner liner film and the internal structure of a tire may have uniform and excellent physical properties over all directions together with a stable structure, a pneumatic tire exhibiting excellent mechanical properties, durability, and fatigue resistance in a tire manufacturing process or in an automobile running process may be provided.

BRIEF DESCRIPTION OF THE DRAWINGS

FIG. 1 schematically shows the structure of a tire.
FIG. 2 shows the radial direction and the circumferential direction of a pneumatic tire.

DETAILED DESCRIPTION OF THE EMBODIMENTS

Hereinafter, the present invention will be explained in detail with reference to the following examples. However, these examples are only to illustrate the invention and the scope of the invention is not limited thereto.

EXAMPLE

Example: Manufacture of a Film for a Tire Inner Liner and a Pneumatic Tire

Example 1

(1) Manufacturing of a Base Film 35 wt % of a nylon 6 resin having a relative viscosity (96% sulfuric acid solution) of 3.3 and 65 wt % of a copolymer resin having a relative weight average molecular weight of 145,000 (including 50 wt % of polyamide-based repeat units and 50 wt % of polyether-based repeat units) were mixed, and the supplied mixture was extruded through a T-type die (die gap—1.0 mm) having a width of 2000 mm at a temperature of 260° C. while maintaining uniform flow of melted resin. The extruded melted resin was cooled and solidified to a film with a uniform thickness [average thickness: 100 µm] using an air knife on the surface of a cooling roll that was controlled to 25° C.

(2) Coating of Adhesive and Drawing in TD

Resorcinol and formaldehyde were mixed at a mole ratio of 1:2, and then condensed to obtain a condensate of resorcinol and formaldehyde. 12 wt % of the condensate of resorcinol and formaldehyde and 88 wt % of styrene/butadiene-1,3/vinylpyridine were mixed to obtain a resorcinol-formalin-latex (RFL)-based adhesive with a concentration of 20%.

The resorcinol-formalin-latex (RFL)-based adhesive was coated on the base film to a thickness of 1 µm using a gravure coater.

Subsequently, the base film on which adhesive was coated was drawn in the transverse direction (TD) in a hot-air oven including a caterpillar rail equipped with a mechanical grip. Specifically, the hot-air oven consisted of three sections, wherein the temperature of the first section was set to 110° C., the temperature of the second section was set to 130° C., and the temperature of the third section was set to 150° C., and in the second section, the base film was drawn 20% in the transverse direction (TD) using a mechanical grip.

The speed of a winder that wound the base film on which an adhesive layer was coated was adjusted to maintain a residence time of the base film in the hot-air oven at about 60 seconds, and heat treatment of the adhesive layer and drawing in the transverse direction (TD) were completed.

Example 2

A film for a tire inner liner was manufactured by the same method as Example 1, except for the following processes (1) and (2).

(1) The temperature in the first section of the hot air oven was set to 100° C., the temperature of the second section was set to 130° C., the temperature of the third section was set to 140° C., and in the second section of the hot air oven, the base film was drawn 40% in the transverse direction (TD) using a mechanical grip.

(2) The speed of a winder that wound the base film on which an adhesive layer was coated was adjusted to maintain residence time of the base film in the hot-air oven at about 120 seconds, and heat treatment of the adhesive layer and drawing in the transverse direction (TD) were completed.

Example 3

A film for a tire inner liner was manufactured by the same method as Example 1, except for the following processes (1) to (3).

(1) The die gap of the t-type die was set to 0.7 mm.

(2) The temperature of the first section of the hot air oven was set to 120° C., the temperature of the second section was set to 120° C., and the temperature of the third section was set to 150° C., and in the first section and the second section of the hot air oven, the base film was respectively drawn 5% in the transverse direction (TD) using a mechanical grip to a draw total of 10%.

(3) The speed of a winder that wound the base film on which an adhesive layer was coated was adjusted to maintain residence time of the base film in the hot-air oven at about 120 seconds, and heat treatment of the adhesive layer and drawing in the transverse direction (TD) were completed.

Example 4

A film for a tire inner liner was manufactured by the same method as Example 1, except for the following processes (1) to (3).

(1) The die gap of the t-type die was set to 0.7 mm.

(2) The temperature of the first section of the hot air oven was set to 110° C., the temperature of the second section was set to 130° C., and the temperature of the third section was set to 140° C., and in the first section to the third section of the hot air oven, the base film was respectively drawn 5% in the transverse direction (TD) using a mechanical grip to a draw total of 15%.

(3) The speed of a winder that wound the base film on which an adhesive layer was coated was adjusted to maintain a residence time of the base film in the hot-air oven at about 150 seconds, and heat treatment of the adhesive layer and drawing in the transverse direction (TD) were completed.

Example 5

(1) Manufacturing of a Base Film

A base film having a uniform thickness [average thickness: 100 μm] was obtained by the same method as Example 1.

(2) Coating of Adhesive and Drawing in TD

1) Drawing in TD

The base film was drawn in the transverse direction (TD) in a first hot-air oven including a caterpillar rail equipped with a mechanical grip. The first hot-air oven consisted of three sections, wherein the temperatures of the first to third sections were all set to 110° C., the base film was drawn 20% in the transverse direction in the second section, and the drawn base film was stabilized in the third section. The residence time of the base film in the first hot air oven was maintained at about 30 seconds.

2) Coating of Adhesive

On the base film obtained in the first drawing step, a resorcinol-formalin-latex (RFL)-based adhesive was coated to a thickness of 1 μm using a gravure coater by the same method as Example 1.

Further, the base film on which the RFL-based adhesive was coated was dried and heat treated in a second hot air oven including a caterpillar rail equipped with a mechanical grip to complete heat treatment of the adhesive layer.

The second hot air oven consisted of three sections, wherein the temperature of the first section was set to 130° C., the temperature of the second section was set to 140° C., and the temperature of the third section was set to 150° C. The speed of a winder that wound the base film on which an adhesive layer was coated was adjusted to maintain residence time of the base film in the hot-air oven at about 30 seconds, and heat treatment of the adhesive layer was completed.

Example 6

A film for a tire inner liner was manufactured by the same method as Example 1, except that a compounded substance including 50 wt % of a polyamide-based polymer and 50 wt % of a polyether-based polymer was used instead of the copolymer having an absolute weight average molecular weight of 145,000.

Example 7

(1) Manufacturing of a Base Film 35 wt % of nylon 6 resin having a relative viscosity (96% sulfuric acid solution) of 3.3 and 65 wt % of a copolymer resin having a relative weight average molecular weight of 145,000 (including 50 wt % of polyamide-based repeat units and 50 wt % of polyether-based repeat units) were mixed, and the supplied mixture was extruded through a t-type die (die gap—1.0 mm) having a width of 1800 mm at a temperature of 260° C. while maintaining uniform flow of melted resin.

Herein, the discharge amount of raw material from the die was set to 1550 g/min, and the extruded an melted resin was cooled and solidified to a film [thickness 90 μm, width 1700 mm, density 1.05 g/cm$^3$] on the surface of a casting roll of a cooling part that was maintained at 25° C. using an air knife.

The speed of the casting roll of a cooling part was 9.6 m/min, and the manufactured base film was oriented in the machine direction (MD) at a melt draft ratio in the extrusion die of 11.7.

(2) Drawing in the Machine Direction (MD) in the Manufacturing Step of a Base Film To further orient the obtained base film in the machine direction (MD), the speed of the roll at the back end of the casting roll of a cooling part was increased to 10.6 m/min, thereby manufacturing a base film having a final thickness of 85 μm and a width of 1632 mm at a draw ratio of 1.1 after the extrusion die.

(3) Coating of Adhesive

Resorcinol and formaldehyde were mixed at a mole ratio of 1:2, and then condensed to obtain a condensate of resorcinol and formaldehyde. 12 wt % of the condensate of resorcinol and formaldehyde and 88 wt % of styrene/butadiene-1,3/vinylpyridine were mixed to obtain a resorcinol-formalin-latex (RFL)-based adhesive at a concentration of 20%.

The resorcinol-formalin-latex (RFL)-based adhesive was coated on the base film to a thickness of 1 μm using a gravure coater, and dried at 150° C. for 1 minute and reacted to form an adhesive layer. At this time, drawing in the machine direction (DM) of the base film by a peripheral speed difference between coating rolls was not undertaken.

A melt draft ratio in the extrusion die of 11.7 and a draw ratio after the extrusion die of 1.1 were applied to the obtained film for a tire inner liner, so that total draft in the machine direction of the film became 12.9.

Example 8: Manufacturing of a Film for a Tire Inner Liner (1) Manufacturing of a Base Film A base film was manufactured by the same method as Example 7, except for using the following 1) and 2).

1) The discharge amount of raw material from the die was set to 1770 g/min, and the extruded melted resin was cooled and solidified to a film [thickness 98 μm, width 1720 mm] on the surface of a casting roll of a cooling part that was maintained at 25° C. using an air knife.

2) The speed of the casting roll of a cooling part was 10 m/min, and the manufactured base film was oriented in the machine direction (MD) at a melt draft ratio in the extrusion die of 10.7.

(2) Drawing in the Machine Direction (MD) in the Manufacturing Step of a Base Film To further orient the obtained base film in the machine direction (MD), the speed of the roll at the back end of the casting roll of a cooling part was increased to 14 m/min, thereby manufacturing a base film having a final thickness of 77 μm and a width of 1565 mm at a draw ratio after the extrusion die of 1.4.

(3) Coating of Adhesive

A resorcinol-formalin-latex (RFL)-based adhesive was coated on the obtained base film to a thickness of 1 μm to form an adhesive layer by the same method as Example 7.

Total draft of the finally manufactured inner liner film in the machine direction was 15.0.

Example 9: Manufacturing of a Film for a Tire Inner Liner (1) Manufacturing of a Base Film An oriented base film was manufactured at a melt draft ratio in an extrusion die of 11.7 by the same method as Example 7, except that additional drawing in the machine direction was not applied in the manufacturing step of the base film.

(2) Coating of Adhesive

Resorcinol and formaldehyde were mixed at a mole ratio of 1:2, and then condensed to obtain a condensate of resorcinol and formaldehyde. 12 wt % of the condensate of resorcinol and formaldehyde and 88 wt % of styrene/butadiene-1,3/vinylpyridine were mixed to obtain a resorcinol-formalin-latex (RFL)-based adhesive at a concentration of 20%.

The resorcinol-formalin-latex (RFL)-based adhesive was coated on the base film to a thickness of 1 μm using a gravure coater, and dried at 150° C. for 1 minute and reacted to form an adhesive layer.

In the coating step of the resorcinol-formalin-latex (RFL)-based adhesive, a nipping roll of which speed was controlled identically to the unwinder at the front end of a gravure coater was installed, wherein the speed of the unwinder was set to 20 m/min, and the speed of the winder that wound the base film on which the adhesive layer was formed was set to 26 m/min, so that draft became 1.3, thus orienting the base film on which the adhesive was coated in the machine direction (MD).

The total draft of the finally manufactured inner liner film [thickness 77 μm, width 1530 mm] in the machine direction was 15.2.

Example 10: Manufacturing of a Film for a Tire Inner Liner (1) Manufacturing of a Base Film A base film that was oriented in the machine direction (MD) was manufactured at a melt draft ratio in an extrusion die of 11.7 by the same method as Example 7.

(2) Drawing in the Machine Direction (MD) in the Manufacturing Step of a Base Film To further orient the obtained base film in the machine direction (MD), the speed of the roll at the back end of the casting roll of a cooling part was increased to 11.5 m/min, and a draw ratio in the manufacturing step of the base film was set to 1.2.

(3) Coating of Adhesive

Resorcinol and formaldehyde were mixed at a mole ratio of 1:2, and then condensed to obtain a condensate of resorcinol and formaldehyde. 12 wt % of the condensate of resorcinol and formaldehyde and 88 wt % of styrene/butadiene-1,3/vinylpyridine were mixed to obtain a resorcinol-formalin-latex (RFL)-based adhesive at a concentration of 20%.

The resorcinol-formalin-latex (RFL)-based adhesive was coated on the base film to a thickness of 1 μm using a gravure coater, and dried at 150° C. for 1 minute and reacted to form an adhesive layer.

In the coating step of the resorcinol-formalin-latex (RFL)-based adhesive, a nipping roll of which speed was controlled identically to the unwinder at the front end of a gravure coater was installed, wherein the speed of the unwinder was set to 20 m/min, and the speed of the winder that wound the base film on which the adhesive layer was formed was set to 24 m/min so that the draft became 1.2, thus orienting the base film on which the adhesive was coated in the machine direction (MD). [Draw ratio after the extrusion die=1.2*1.2]

The total draft of the finally manufactured inner liner film [thickness 71 μm, width 1510 mm] in the machine direction was 16.9.

Example 11: Manufacturing of a Film for a Tire Inner Liner

A film for a tire inner liner was manufactured by the same method as Example 7, except that a compounded substance including 50 wt % of a polyamide-based polymer and 50 wt % of a polyether-based polymer was used instead of the copolymer having an absolute weight average molecular weight of 145,000. The density of the base film was 1.05 g/cm³.

Example 12: Manufacturing of a Pneumatic Tire (1) The film for a tire inner liner obtained in Examples 1 to 6 was mounted on a tire forming drum in the horizontal direction to the width direction of the tire forming drum, such that the transverse direction (TD) of the base film became the radial direction (a direction parallel to the axial direction of the tire forming drum) of a tire.

(2) The film for a tire inner liner obtained in Examples 7 to 11 was mounted on a tire forming drum in the horizontal direction to the width direction of the tire forming drum, such that the machine direction (MD) of the base film became the radial direction (a direction parallel to the axial direction of the tire forming drum) of a tire.

A body ply layer was laminated on the film for a tire inner liner, a bead wire was attached to the end of the body ply layer in the width direction of the forming drum, a belt part was formed on the body ply layer, a cap ply part was formed on the belt part, and a rubber part was formed on the belt part to manufacture a green tire.

The manufactured green tire was put in a mold, and a tire with a standard of 205R/75R15 was manufactured through vulcanization at 160° for 30 minutes. At this time, 1300De'/2ply HMLS tire cord was used as the cord included in the body ply, steel cord was used as the belt, and N66 840De'/2ply was used as the cap ply.

Comparative Example

Comparative Example 1

A film for a tire inner liner was manufactured by the same method as Example 1, except that the drawing process of the base film in the transverse direction, after coating the adhesive, was omitted.

Comparative Example 2

A film for a tire inner liner was manufactured by the same method as Example 1, except that the base film was drawn 60% in the transverse direction in the second section of the hot air oven.

Comparative Example 3

A film for a tire inner liner was manufactured by the same method as Example 1, except that the base film was drawn 3% in the transverse direction in the second section of the hot air oven.

Comparative Example 4: Manufacturing of a Film for a Tire Inner Liner

A film for a tire inner liner was manufactured by the same method as Example 7, except that the drawing process in the machine direction in the manufacturing process of the base film was omitted.

Comparative Example 5: Manufacturing of a Film for a Tire Inner Liner (1) Manufacturing of a Base Film A base film [thickness 121 μm, width 1750 mm] was manufactured by the same method as Example 7, except that the die gap of the t-type die was set to 0.5 mm, and the speed of the casting roll of a cooling part was set to 7 m/min. The melt draft ratio in the extrusion die was 4.3.

(2) Drawing in the Machine Direction (MD) in the Manufacturing Step of a Base Film To further orient the obtained base film in the machine direction (MD), the speed of the roll at the back end of the casting roll of a cooling part was increased to 7.7 m/min, thereby manufacturing a base film at a draw ratio of 1.1 after the extrusion die.

(3) Coating of Adhesive

A resorcinol-formalin-latex (RFL)-based adhesive was coated on the manufactured base film to a thickness of 1 μm using a gravure coater by the same method as Example 7.

The total draft of the finally manufactured inner liner film [thickness 114 μm, width 1680 mm] in the machine direction was 4.7.

Comparative Example 6: Manufacturing of a Film for a Tire Inner Liner (1) Manufacturing of a Base Film A base film [thickness 89 μm, width 1650 mm] was manufactured by the same method as Example 1, except that the die gap of a t-type die was set to 1.3 mm, and the speed of the casting roll of a cooling part was set to 10 m/min. The melt draft ratio in the extrusion die was 15.9.

(2) Drawing in the Machine Direction (MD) in the Manufacturing Step of a Base Film To further orient the obtained base film in the machine direction (MD), the speed of the roll at the back end of the casting roll of a cooling part was increased to 14 m/min, thereby manufacturing a base film at a draw ratio of 1.4 after the extrusion die.

(3) Coating of Adhesive

A resorcinol-formalin-latex (RFL)-based adhesive was coated on the manufactured base film to a thickness of 1 μm using a gravure coater by the same method as Example 7.

The total draft of the finally manufactured inner liner film [thickness 71 μm, width 1485 mm] in the machine direction was 22.2.

Comparative Example 7: Manufacturing of a Pneumatic Tire (1) A pneumatic tire was manufactured by the same method as Example 12, except that the film for a tire inner liner obtained in Comparative Examples 1 to 3 was mounted on a tire forming drum in the horizontal direction to the width direction of the tire forming drum so that the transverse direction (TD) of the base film became the radial direction (a direction parallel to the axial direction of the tire forming drum) of a tire.

(2) A pneumatic tire was manufactured by the same method as Example 12, except that the film for a tire inner liner obtained in Comparative Examples 4 to 6 was mounted on a tire forming drum in the horizontal direction to the width direction of the tire forming drum so that the transverse direction (TD) of the base film became the radial direction (a direction parallel to the axial direction of the tire forming drum) of a tire.

Experimental Example

1. Measurement of Physical Properties of a Film for a Tire Inner Liner (1) Measurement of the Strength Ratio of the Machine Direction (MD) and the Transverse Direction (TD) of a Film for a Tire Inner Liner The films for a tire inner liner obtained in the examples and comparative examples were allowed to stand at a temperature of 23° C. under relative humidity of 50% for 24 hours, and then manufactured into a specimen having a length of 30 mm and a width of 30 mm.

The strengths of the machine direction (MD) and the transverse direction (TD) of the manufactured specimens were measured 10 times at a tensile speed of 300 mm/min in a tensile test machine (Instron), and among the measured values, the average value of 8 values excluding the maximum value and the minimum value was calculated.

(2) Oxygen Permeability Test

The oxygen permeability of each film for a tire inner liner obtained in the examples and comparative examples was measured at 25° C. under 60 RH % using an Oxygen Permeation Analyzer (Model 8000, Illinois Instruments product), according to ASTM D 3895.

2. Measurement of Physical Properties of a Tire (1) Measurement of Durability

The durabilities of the tires obtained in Example 12 and Comparative Example 7 were evaluated while increasing a load using an FMVSS139 tire durability measurement method. The durability measurement was conducted by two methods of an endurance test wherein load was increased by step load, and a high speed test wherein speed was increased.

(1) While the measurement result of the tire using the inner liner film of Comparative Example 1 was considered as 100, the measurement results of the tires using the inner liner films of Examples 1 to 6 and Comparative Examples 2 to 3 were compared and evaluated.

(2) While the measurement result of the tire using the inner liner film of Comparative Example 4 was considered as 100, the measurement results of the tires using the inner liner films of Examples 7 to 11 and Comparative Examples 5 to 6 were compared and evaluated.

(2) Measurement of Internal Pressure Retention

For the tires manufactured using the tire inner liner films of the examples and comparative examples, 90 days internal pressure retention was measured at a temperature of 21° C. under pressure of 101.3 kPa according to ASTM F1112-06. It is recognized that if the IPR value is low when internal pressure retention is high.

(3) Tire Preparation Processability

It was confirmed whether or not a defect, a tear, a crack, and the like is generated in the finally manufactured tires of Example 12 and Comparative Example 7, to evaluate tire preparation processability.

In Example 12 and Comparative Example 7, 100 tires were respectively manufactured using the inner liner films of the examples and comparative examples, the inside of each manufactured tire was observed with the naked eye, and the number of normal products without crystals and the like was confirmed to calculate a yield of normal products.

The results of the Experimental Example are shown in the following Table 1 and Table 2.

TABLE 1

The results of experiments of Examples 1 to 6 and Comparative Examples 1 to 3

| | Strength ratio (TD/MD) | Oxygen permeability cc/(m² · 24 hr · atm) | Durability measurement Endurance Test (%) | Durability measurement High Speed Test (%) | Internal pressure retention (IPR) [%/3 months] | Tire/ processibility (%) |
|---|---|---|---|---|---|---|
| Example 1 | 1.54 | 76 | 183 | 178 | 2.1 | 100 |
| Example 2 | 1.86 | 63 | 203 | 206 | 1.3 | 100 |
| Example 3 | 1.15 | 93 | 156 | 148 | 2.6 | 99.7 |
| Example 4 | 1.31 | 82 | 176 | 178 | 1.8 | 100 |
| Example 5 | 1.72 | 70 | 192 | 193 | 1.2 | 100 |
| Example 6 | 1.55 | 78 | 180 | 170 | 2.3 | 100 |
| Comparative Example 1 | 0.83 | 103 | 100 | 100 | 15 | 15.2 |
| Comparative Example 2 | 2.31 | 58 | 38 | 50 | 58 | 25.1 |
| Comparative Example 3 | 1.02 | 98 | 103 | 102 | 5.5 | 33.2 |

As shown in Table 1, it is confirmed that the tire inner liner films of Examples 1 to 6 have a ratio of the strength of the transverse direction (TD) to the strength of the machine direction (MD) of 1.31 to 1.86, the tire inner liner films have optimum oxygen permeability and internal pressure retention and simultaneously may secure excellent durability when practically applied to a tire, and have superior tire processibility compared to the inner liner films of the comparative examples.

To the contrary, when the inner liner films of Comparative Example 1 and Comparative Example 3 are used, it is confirmed that an orientation difference between the circumferential direction and the radial direction of a tire is significantly generated in the manufacturing process of a tire, thus inducing a thickness difference and partial non-uniformity of physical properties of the inner liner films, and thus durability, internal pressure retention, and processibility of a tire are lowered.

Further, when the inner liner film of Comparative Example 2 is used, it is confirmed that when drawn in the transverse direction of the base film, the adhesive layer on the base film is broken to show lowered adhesion to a carcass layer, and thus durability, internal pressure retention, and tire processibility are significantly lowered.

TABLE 2

Results of experiments of Examples 7 to 11 and Comparative Examples 4 to 6

| | Example 7 | Example 8 | Example 9 | Example 10 | Example 11 | Comparative Example 4 | Comparative Example 5 | Comparative Example 6 |
|---|---|---|---|---|---|---|---|---|
| Strength ratio (MD/TD) | 1.2 | 1.4 | 1.4 | 1.8 | 1.2 | 1.1 | 1.0 | 2.2 |
| Oxygen permeability cc/(m² · 24 hr · atm) | 78 | 83 | 92 | 100 | 76 | 115 | 110 | 65 |
| Durability measurement Endurance Test (%) | 145 | 175 | 165 | 183 | 143 | 100 | 105 | 53 |
| Durability measurement High Speed Test (%) | 138 | 183 | 168 | 153 | 139 | 100 | 103 | 55 |
| Internal pressure retention (IPR) [%/3 months] | 1.8 | 1.5 | 1.3 | 1.2 | 1.9 | 45 | 40 | 50 |
| Tire processability (%) | 99.3 | 100 | 100 | 100 | 99.5 | 20.2 | 30.3 | 5.1 |

As shown in Table 2, it is confirmed that the tire inner liner films of Examples 7 to 11 have a ratio of the transverse direction (TD) to the machine direction (DM) of 1.2 to 1.8. Further, the tire inner liner films may have optimum oxygen permeability and internal pressure retention and simultaneously secure excellent durability when practically applied to a tire, and the tire processability is superior to the inner liner films of the comparative examples.

To the contrary, when the inner liner films of Comparative Examples 4 and 6 are used, it is confirmed that an orientation difference between the circumferential direction and the radial direction of a tire is significantly generated in the tire manufacturing process, which induces a thickness difference and partial non-uniformity of physical properties of the inner liner films, and thus durability, internal pressure retention, and processability of a tire are lowered.

Specifically, in the case of Comparative Example 4, an orientation difference between the circumferential direction and the radial direction of a tire is significantly generated in the tire manufacturing process, which induces a thickness difference and partial non-uniformity of physical properties of the inner liner films, thus lowering durability, internal pressure retention, and processability of a tire.

In the case of Comparative Example 5, although an orientation difference between the circumferential direction and the radial direction of a tire is less generated compared to Comparative Example 1, a thickness difference and partial non-uniformity of physical properties of the inner liner film are still generated, thus lowering durability, internal pressure retention, and processability.

In the case of Comparative Example 6, an orientation difference between the circumferential direction and the radial direction of a tire is significantly generated, and tearing of the inner liner film frequently occurred after manufacturing a tire, thus making it difficult to manufacture a normal product.

What is claimed is:

1. A film for a tire inner liner comprising a base film that is drawn or oriented in a first direction, and is in the undrawn state in a second direction perpendicular to the first direction,
   wherein the first direction is set parallel to the axial direction of a tire forming drum for manufacturing a pneumatic tire, and
   a strength ratio of the first direction to the second direction of the base film is 1.1:1 to 2:1,
   wherein the base film comprises (i) a copolymer comprising polyamide-based segments and polyether-based segments, or (ii) a resin mixture of a polymer comprising polyamide-based segments and a polymer comprising polyether-based segments, and
   the content of the polyether-based segments of the copolymer or the content of the polymer comprising polyether-based segments is 5 wt % to 50 wt % based on the total weight of the base film.

2. The film for a tire inner liner according to claim 1, wherein the first direction is identical to the machine direction (MD) of the base film, and the second direction is identical to the transverse direction (TD) of the base film.

3. The film for a tire inner liner according to claim 2, wherein the length of the base film in the second direction is 1000 mm or more.

4. The film for a tire inner liner according to claim 1, wherein the film is drawn 5% to 50% in the first direction of the base film, and further comprising an adhesive layer formed on at least one side of the base film.

5. The film for a tire inner liner according to claim 4, wherein the first direction is identical to the transverse direction (TD) of the base film, and the second direction is identical to the machine direction (MD) of the base film.

6. The film for a tire inner liner according to claim 5, wherein the length of the base film in the first direction is 1000 mm or less.

7. The film for a tire inner liner according to claim 1, wherein the copolymer comprises polyamide-based segments and polyether-based segments at a weight ratio of 7:3 to 3:7.

8. The film for a tire inner liner according to claim 1, wherein the resin mixture comprises the polymer comprising polyamide-based segments and the polymer comprising polyether-based segments at a weight ratio of 7:3 to 3:7.

9. The film for a tire inner liner according to claim 1, wherein the base film further comprises a polyamide-based resin having relative viscosity (96% sulfuric acid solution) of 3.0 to 4.0.

10. The film for a tire inner liner according to claim 9, wherein the base film comprises the polyamide-based resin and the (i) copolymer or the (ii) resin mixture at a weight ratio of 7:3 to 3:7.

11. The film for a tire inner liner according to claim 1, further comprising an adhesive layer that is formed on at least one side of the base film and comprises a resorcinol-formalin-latex (RFL)-based adhesive.

12. A method for manufacturing the film for a tire inner liner of claim 1, comprising: melting and extruding a raw material for a base film to form a base film having a width of 1000 mm or more in the transverse direction (TD); and
orienting the base film such that total draft in the machine direction becomes 6 to 20.

13. The method for manufacturing a film for a tire inner liner according to claim 12, wherein the total draft in the machine direction is a value obtained by multiplying a melt draft ratio in an extrusion die of the following Equation 1 and a draw ratio after the extrusion die:

melt draft ratio in an extrusion die=speed of a casting roll(m/min)/discharge speed of raw material in a die(m/min). [Equation 1]

14. The method for manufacturing a film for a tire inner liner according to claim 13, comprising drawing such that the draw ratio after the extrusion die becomes 1.05 to 1.5.

15. The method for manufacturing a film for a tire inner liner according to claim 12, wherein the step of melting and extruding raw material for a base film to form a base film having a width of 1000 mm or more in the transverse direction (TD) comprises melting and extruding the raw material for a base film in an extrusion die having a die gap of 0.3 to 1.5 mm.

16. The method for manufacturing a film for a tire inner liner according to claim 12, wherein the step of forming a base film comprises melting and extruding raw material for a base film comprising (i) a copolymer comprising polyamide-based segments and polyether-based segments, or (ii) a resin mixture of a polymer comprising polyamide-based segments and a polymer comprising polyether-based segments at 230° C. to 300° C. to form a film having a thickness of 30 μm to 300 μm, and
the content of the polyether-based segments or the content of the polymer comprising polyether-based segments of the copolymer is 5 wt % to 50 wt %, based on the total weight of the base film.

17. The method for manufacturing a film for a tire inner liner according to claim 16, wherein the raw material for a base film further comprises a polyamide-based resin.

18. The method for manufacturing a film for a tire inner liner according to claim 17, wherein the raw material for a base film comprises the polyamide-based resin and the copolymer or the mixture at a weight ratio of 7:3 to 3:7.

19. The method for manufacturing a film for a tire inner liner according to claim 16,
wherein the copolymer comprises the polyamide-based segments and the polyether-based segments at a weight ratio of 7:3 to 3:7, and
the resin mixture comprises the polymer comprising polyamide-based segments and the polymer comprising polyether-based segments at a weight ratio of 7:3 to 3:7.

20. The method for manufacturing a film for a tire inner liner according to claim 12,
further comprising coating a resorcinol-formalin-latex (RFL)-based adhesive on at least one side of the base film layer to a thickness of 0.1 μm to 20 μm to form an adhesive layer.

21. A pneumatic tire manufactured using the film for a tire inner liner of claim 1.

* * * * *